Oct. 27, 1964 R. J. ROSA 3,154,702
ELECTRODE ARRANGEMENT IN MHD EQUIPMENT
Filed Jan. 25, 1960 2 Sheets-Sheet 1

RICHARD J. ROSA
INVENTOR.

BY
ATTORNEYS

RICHARD J. ROSA
INVENTOR.

3,154,702
ELECTRODE ARRANGEMENT IN MHD
EQUIPMENT
Richard J. Rosa, Reading, Mass., assignor to Avco Corporation, Cincinnati, Ohio, a corporation of Delaware
Filed Jan. 25, 1960, Ser. No. 4,407
12 Claims. (Cl. 310—11)

The present invention relates to equipment for generating or using electric power. More specifically, the present invention relates to an improvement in electrodes for use in magnetohydrodynamic (hereinafter abbreviated "MHD") equipment. Although not limited to such applications, for convenience the present invention will be described with particular reference to its use in MHD generators.

In MHD generators movement of an electrically conductive fluid relative to a magnetic field generates an electromotive force that establishes current flow between electrodes in conductive relationship with the fluid. Usually, but not necessarily, the electrically conductive fluid comprises an ionized high temperature gas under pressure which expands in passing through the generator. For efficient operation and to maintain conductivity with the gas, the electrodes within the generator extend parallel to the direction of gas movement. Conductivity is reduced, however, by the formation of an aerodynamic boundary layer as the gases flow past the electrodes. It is the purpose of the present invention to overcome this difficulty and to promote more efficient operation of the generator.

In an MHD generator current is carried by the drift of electrons and ions relative to each other, the electrons, by virtue of their much smaller mass doing most of the drifting. In most types of MHD generators, it is necessary for this current to flow from the gas to the electrodes and through the external load. (These electrodes play much the same part in an MHD generator as do the brushes in a conventional generator.) If these electrodes are flush with the walls of the MHD generator, the current of electrons and ions must flow through the aerodynamic boundary layer to reach them. Since the walls will, in general, be cooler than the body of the gas stream, the boundary layer gas will in general be cooled, deionized, and hence be a poor conductor offering relatively high impedance to current flow.

The present invention relates to an improved electrode arrangement which has been found in practice to give improved performance. In this arrangement the electrodes project from the generator walls into the gas stream. Since the boundary layer increases in thickness along the path of gas movement, the distance which the electrodes project out from the wall is larger for those near the exit of the generator than for those near the entrance. In other words, the length of the electrodes is graduated along the length of the gas flow channel. Although the projection of the electrodes into the moving gas stream tends to make the boundary layer thicker than it would otherwise be this undesirable effect is more than offset by the improved contact of the electrodes with the gas.

In view of the foregoing, it will be apparent that a broad object of the present invention is to provide improved MHD equipment and more particularly to provide an improved arrangement of electrodes for use in such equipment.

Another broad object of the invention is to provide an arrangement of electrodes for improving the operating efficiency of MHD equipment.

In general terms it is an object of the invention to provide electrodes for use in MHD equipment, the electrodes being arranged so that electrical conductivity with the conductive fluid within the equipment is assured.

More specifically it is an object of the invention to provide in MHD equipment a plurality of discrete electrodes of graduated length, the length being proportional to the thickness of the boundary layer of the fluid flowing through the generator.

Another object of the invention is to provide for use in MHD equipment electrodes that are arranged to assure electrical conductivity of all electrodes with the electrically conductive fluid flowing within the equipment.

Another object of the invention is to eliminate any need for heating electrodes in MHD equipment to promote conductivity with the working fluid passing through the equipment.

A further object of the invention is to provide in MHD equipment an electrode arrangement which readily lends itself for use with a variety of electrical circuits associated with the equipment.

The novel features that I consider characteristic of my invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 3 is a longitudinal sectional view through a modified form of generator showing the improved electrodes connected to a load circuit different from that shown in FIGURE 2.

Figure 1:
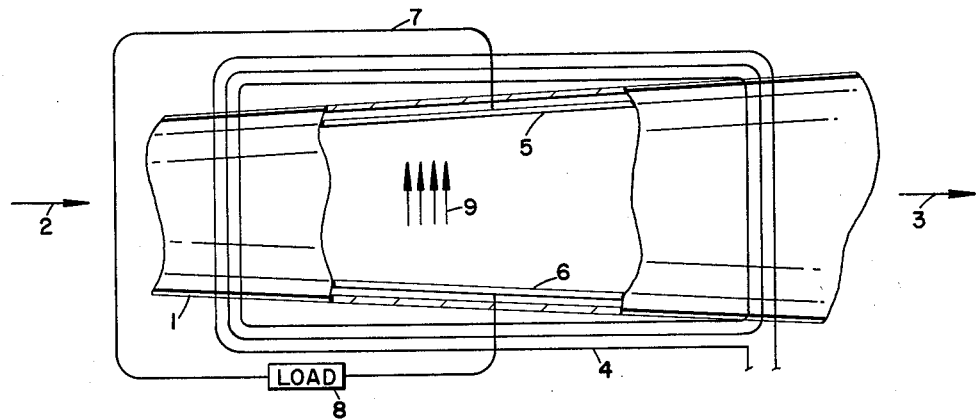
FIGURE 1 is a diagrammatic illustration of a conventional MHD generator.

Referring first to FIGURE 1, there is shown a conventional MHD generator comprising a duct 1 to which an electrically conductive gas under pressure is introduced, as indicated by the arrow at 2, and from which it exhausts, as indicated by the arrow at 3. Associated with the duct is a coil 4 comprising a continuous electrical conductor through which current flows. The flow of current through the coil establishes a magnetic field transversely through the duct perpendicular to the direction of gas flow. Current for the coil may be supplied by any conventional source or by the generator itself and for this reason the source has not been shown. The sidewall of the duct is broken away to show a pair of electrodes 5 and 6 which are connected by conductor 7 to a load 8. The electrodes are opposed and aligned perpendicular to the direction of the magnetic field and the direction of gas movement.

By way of illustration, but not of limitation, the electrically conductive gas may comprise helium, or argon, with an addition of approximately 1% sodium, potassium, or cesium to promote ionization. Ionization is also promoted by the high temperature of the gas stream which may be in the order of 3000° K. Gas of such composition and temperature, entering the generator at ten atmospheres pressure, may have a conductivity in the order of 100 mhos per meter.

Movement of the electrically conductive gas through the magnetic field induces an E.M.F. between the electrodes 5 and 6, indicated by the arrows at 9. As a result, current flows from the electrodes through the load circuit. It will be noted that the generator has no moving parts and in effect uses an electrically conductive gas stream to generate electric power in much the same way that power is generated in a conventional generator by movement of a conductor in a magnetic field.

Movement of the gas over the surface of the electrodes 5 and 6 causes an aerodynamic boundary layer to build up. The boundary layer results from the viscosity of the gas passing over the fixed surfaces of the electrodes and the walls of the duct. The boundary layer indicates the presence of a sluggish, relatively slow-moving layer of gas. Because of its presence next to the electrodes, which are necessarily colder than the gas stream because of heat loss to the external environment, the average temperature of the boundary layer is less than that of the main gas stream. As a result, deionization occurs and the electrical conductivity of the boundary layer is less than that of the main stream. The loss of conductivity of the gas immediately adjacent the electrodes tends to impede the ready flow of current from the gas stream to them. This is obviously detrimental to the operation of the generator, and under certain operating conditions, may drastically reduce its operating efficiency.

Figure 2:
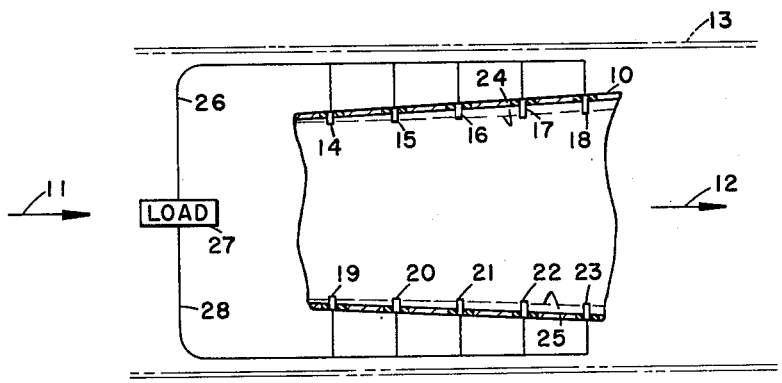
FIGURE 2 is a longitudinal sectional view through an MHD generator having electrodes arranged in accordance with the principles of the present invention.
Figure 5:
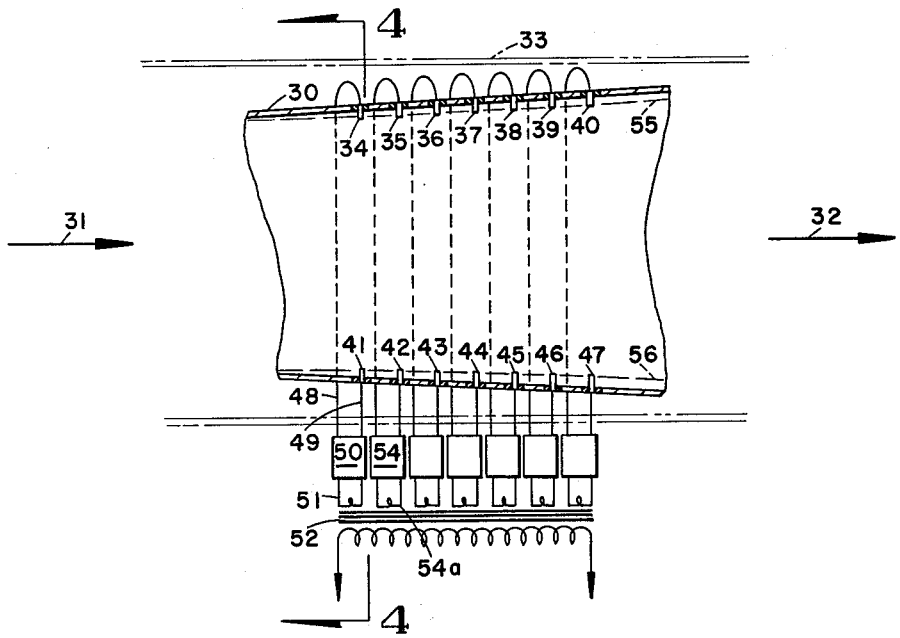

Shown in FIGURE 2 is an MHD generator having an improved arrangement of electrodes which overcomes the detrimental effects of the boundary layer. As shown in FIGURE 2, the duct 10 is supplied with electrically conductive gas at 11, the gas exhausting from the duct at 12. Suggested diagrammatically by phantom lines is an electric coil 13 which provides a magnetic field transverse of the generator and perpendicular to the gas stream.

Instead of continuous electrodes as shown in FIGURE 1, the electrodes of the FIGURE 2 embodiment are made in discrete segments the upper electrode comprising segments 14–18 and the lower electrode comprising discrete segments 19–23.

It will be noted that the electrodes are secured to and electrically insulated from the duct 10 and project into the gas stream. It will also be noted that the electrodes are of graduated length, the electrode length gradually increasing from the upstream end to the downstream end of the duct. In other words, electrode 18 extends into the duct a greater distance than electrode 14. The same is true with respect to electrode 23 which extends into the duct farther than electrode 19.

Indicated by dash lines 24 and 25 are aerodynamic boundary layers which form adjacent the walls of the duct. For purposes of illustration, the thickness of the boundary layers has been exaggerated somewhat. As already mentioned the boundary layer comprises gas which is relatively colder than the main gas stream 11, and for this reason, has less electrical conductivity. To overcome the decreased conductivity of the boundary layer, the electrodes are made long enough to extend through the boundary layer into electrically conductive relationship with the main portion of the gas stream flowing through the duct. This will be apparent from a study of the electrodes 14–18. It will be noted that each electrode extends through boundary layer 24. The same is true with respect to electrodes 19–23 which project through the boundary layer and maintain good electrical conductivity with the main gas stream.

For purposes of illustration only, electrode segments 14–18 are shown connected in parallel to conductor 26 which is in circuit with load 27. Conductor 28 completes the load circuit and is connected in parallel to the electrode segments 19–23 and to load 27. The projection of the electrodes into the moving gas stream in itself tends to accentuate or promote the formation of the boundary layer. However, losses incidental to the increase in boundary layer thickness are more than offset by the improved conductivity than can be maintained with the gas stream.

The benefits of the present electrode arrangements are not in any way dependent upon the load circuit of the generator. This is illustrated by FIGURE 3 which shows the electrodes connected to a different type of external circuit. With reference to that figure, a duct 30 is shown to which is introduced an electrically conductive high temperature gas 31, the gas exhausting from the generator at 32. As in the previous embodiments, an electrical coil, diagrammatically indicated by phantom lines 33, is provided to establish a magnetic field perpendicular to the moving gas stream and a plurality of electrode segments at opposite sides of the duct. Thus, as viewed in FIGURE 3, electrode segments 34–40 are provided at the upper portion of the duct and opposed electrode segments 41–47 are provided at the lower portion of the duct. It will be noted, however, that the electrode segments at the upper and lower portions of the duct are connected to separate loads as will now be described.

It will be noted that opposed electrode segments 34 and 41 are connected by conductors 48 and 49 to a separate load 50. The load 50 may be a conventional inverter having as its output a coil 51. Coil 51 may be one of a plurality of primary windings feeding transformer 52 the secondary of which may be connected to any circuit (not shown) requiring an A.C. supply. In a similar manner opposed electrode segments 35 and 42 may be connected to a separate inverter 54 having coil 54a associated with it. This may be repeated with each pair of opposed electrode segments.

As in the FIGURE 2 embodiment, it will be noted that the electrode segments of FIGURE 3 are graduated in length, being in length proportional to the thickness of boundary layers 55 and 56. Thus, as already described with reference to FIGURE 2, electrode segment 40 projects farther into the duct than electrode segment 34 so that each electrode projects into electrically conductive relationship with the main portion of the gas stream.

Since the electrode segments of FIGURE 3 are electrically separate from one another, they may float at electrical potentials determined by the build-up of Hall potential resulting from separation of electrons and ions longitudinally within the moving gas stream. This has the benefit of overcoming any tendency for internal circulation of Hall currents within the generator. Despite the fact that the opposed segments float at different potential levels depending upon their position along the duct, the potential difference between opposed pairs of electrode segments is substantially the same.

Figure 4:
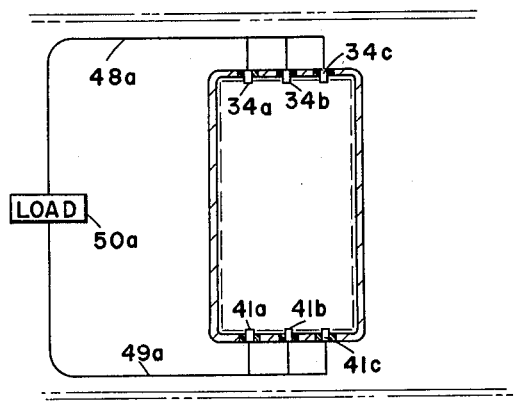
FIGURE 4 is a cross sectional view of an MHD generator taken on plane 4—4 of FIGURE 3.

FIGURE 4 illustrates the fact that several electrode segments may be used at any transverse plane of the generator. Thus, in FIGURE 4, three electrode segments 34a–34c may be used in place of electrode segment 34. These segments may be connected in parallel to a conductor 48a which is connected to load 50a, comparable to inverter 50 in FIGURE 3. Similarly electrode segments 41a–41c may replace electrode segments 41 and may be connected in parallel to conductor 49a which is connected to the load 50a. Thus it will be noted that whereas individual opposed electrodes 34 and 41 are illustrated in FIGURE 3, these may actually comprise a plurality of electrode segments arranged in a transverse plane and connected to a common load. Such an arrangement of electrode segments assures full utilization of the cross sectional area of the duct for formation of current paths through the gas stream.

If desired the individual electrode segments 34a–34c may in themselves be connected to individual circuits and may supply current to separate inverters. Since such a modification is obvious from the foregoing description, it need not be illustrated.

The length of any particular electrode segment may be determined from the thickness of the boundary layer adjacent the segment. Generally speaking, the thickness of the boundary layer is proportional to the square root of the length of the path along which the gas has travelled.

The importance of the present invention can now be fully appreciated. As has already been explained, it is important to the operation of an MHD generator, or any piece of MHD equipment, that an electrically conductive path be maintained between the electrodes and the gas stream. By making the length of the electrodes greater than the thickness of the boundary layer, conductivity with the gas stream may be maintained under all operating conditions. Thus the drawback of the boundary layer, which is aerodynamically inherent in any piece of equipment of this type, can be negated. Use of the present improved electrode arrangement eliminates any need for heating the electrodes, particularly those serving as cathodes, to the point where electron emission is assured. With good conductivity between electrodes and gas stream, the formation of an arc between opposed electrodes, as a result of the induced E.M.F., is a certainty. Thus the invention has particular importance with reference to the arrangement of cathodes, rather than anodes, within MHD equipment, but it should be understood that anodes made in accordance with the teaching of the present invention will also enhance over-all operating efficiency.

Another advantage of the novel arrangement of electrodes, particularly those shown in FIGURES 3 and 4, is that the formation of a plurality of paths for current flow between electrode segments is assured. Thus, in FIGURE 3, the electrode segments, being connected in separate circuits, are all forced to carry current and there will be no tendency for any electrode to carry more current than others. In contrast, in the FIGURE 2 arrangement, the electrode segments, being connected in parallel, may not carry current uniformly. Thus, under certain operating conditions, particular electrode segments, such as segments 16–18 and 21–23 may tend to carry an increasingly heavy current load, deprived electrodes 14–15 and 19–20 of their effectiveness.

As a matter of interest it will be noted that a conventional MHD generator of the type shown in FIGURE 1, no purpose would be served in trying to position the electrodes so that their surfaces project beyond the boundary layer caused by movement of the gases over the interior walls of the duct. This will be apparent when it is recognized that the electrodes themselves constitute surfaces for retarding gas movement and hence the boundary layer will form along the surfaces of the electrodes themselves. With this thought in mind it will be readily apparent that the discrete electrode segments projecting through the bondary layer assure effective operation which cannot be attained by use of continuous electrodes of the type shown in FIGURE 1.

The specific physical form of the electrode segments shown in FIGURES 2–4 is not critical in the present invention. For convenience, the electrode segments have been shown as short rods extending through the boundary layer. The cross sectional form of the rods or their shape in a direction parallel to their length is not material since the benefits of the invention can be realized regardless of the form of electrode segment. Likewise the material of the electrodes constitutes in no way a limitation of the invention. Such electrodes may be made from refractory metals, stainless steel, or from copper, if internal cooling is provided.

For convenience, the invention has been described with particular reference to an MHD generator. It will be appreciated by those skilled in the art, however, that the invention can be applied equally well to MHD equipment of other types. To illustrate, such electrodes could be used to advantage in an MHD accelerator in which a potential difference is applied across opposed electrodes to accelerate an electrically conductive fluid moving through a transverse magnetic field normal to the aligned direction of the electrodes.

In conclusion, it will be understood that the present invention comprises an improved arrangement of electrodes for use in all types of MHD equipment. Such electrodes offset any disadvantages inherent in the presence of a boundary layer within the equipment and assure the maintenance of an electrically conductive path with the high temperature electrically conductive working fluid of the equipment.

Having described a preferred embodiment of my invention, I claim:

1. In combination in an MHD generator having a duct for accommodating flow of an ionized electrically conductive gas and having an electrical coil adjacent the duct for establishing a magnetic field through the duct transverse of the gas stream, the gas forming an aerodynamic boundary layer adjacent the walls of the duct of a thickness proportional to the distance along the duct traversed by the gas, a plurality of electrically conductive electrodes spaced at intervals transverse of and longitudinally of the duct, the length of said electrodes being graduated to extend through the boundary layer and into electrically conductive relationship with the gas, said electrodes in any given plane transverse of the duct being of substantially the same length, said electrodes being positioned at opposite sides of the duct normal to both the magnetic field and the direction of gas flow, movement of the gas relative to the magnetic field inducing an electromotive force between said opposed electrodes.

2. Apparatus as defined by claim 1 in which said electrodes at each side of the duct are connected in parallel and are connected to a load.

3. Apparatus as defined by claim 1 in which said electrodes at each side of the duct in any given transverse plane are connected in parallel and are connected to a separate load.

4. In combination in an MHD generator having a duct for accommodating flow of an ionized electrically conductive gas and having means for maintaining a magnetic field transversely through the duct, the duct being characterized by the formation of an aerodynamic boundary layer of gas along its walls, a plurality of separate electrodes along the length of the duct proportioned in length to extend through the boundary layer and into electrically conductive relationship with the gas, said electrodes being positioned at opposite sides of the duct at an angle to both the magnetic field and the direction of gas flow, movement of the gas relative to the magnetic field inducing an electromotive force between said opposed electrodes.

5. Apparatus as defined in claim 4 and, in addition, a load circuit interconnecting said electrodes externally of the duct.

6. In combination in an MHD generator having a channel for accommodating flow of electrically conductive gas and having means for maintaining a magnetic field through the channel normal to the direction of gas flow, a plurality of electrode segments projecting into the channel normal to both the direction of gas flow and the magnetic field, the extent to which said electrode segments project into the channel being a function of their position along the channel in the direction of gas flow.

7. In combination in MHD euqipment having a flow channel for accommodating a stream of electrically conductive fluid and characterized by the formation of a fluid boundary layer of increasing thickness along the walls of the channel in the direction of fluid movement, a plurality of separate electrodes along the length of the channel extending through the boundary layer and into electrically conductive relationship with the fluid.

8. Apparatus as defined by claim 7 in which said electrodes are spaced both longitudinally of the channel and transversely of its length, said electrodes in any given transverse plane being of substantially the same length.

9. In combination in MHD equipment having a flow channel for accommodating a stream of electrically conductive fluid and means for maintaining a magnetic field transversely through the channel, a plurality of discrete electrodes projecting into the channel normal to both the magnetic field and the direction of flow of said fluid and into electrically conductive relationship with the fluid, the projection of said electrodes into the channel being greater for those downstream than those upstream of the stream of fluid.

10. In a device of the type having a duct for conveying a stream of electrically conductive fluid in which the fluid forms a boundary layer adjacent the walls of the duct, means for establishing an electrically conductive path with the fluid comprising a plurality of spaced electrodes projecting into the duct normal to the direction of flow of said fluid, the projection of said electrodes being sufficient to extend through the boundary layer and into electrically conductive relationship with the fluid.

11. In a device of the type having a flow channel for conveying an electrically conductive medium which tends to form a boundary layer adjacent the surfaces of the channel, means for establishing electrical conduction with the medium comprising a plurality of spaced conductors extending through the boundary layer into electrically conductive relationship with the medium, the length of said conductors being a function of the thickness of the boundary layer adjacent the conductor.

12. In a device of the type having a channel for conveying an electrically conductive medium which tends to form a boundary layer adjacent the walls of the channel of a thickness proportional to its length of travel along the channel, means for establishing electrical conduction with the medium comprising a plurality of conductors of graduated length positioned at spaced intervals along the channel, the length of said conductor being sufficient to extend through the boundary layer into electrically conductive relationship with the medium.

References Cited in the file of this patent

UNITED STATES PATENTS 1,443,091    Petersen _____ Jan. 23, 1923

FOREIGN PATENTS 841,613    Germany _____ June 16, 1952